United States Patent
Cajegas, III

(10) Patent No.: US 8,842,783 B2
(45) Date of Patent: Sep. 23, 2014

(54) ACCELERATED CARRIER ACQUISITION METHOD FOR A DIGITAL COMMUNICATION RECEIVER

(71) Applicant: Comtech EF Data Corp., Tempe, AZ (US)

(72) Inventor: Lazaro F. Cajegas, III, Mesa, AZ (US)

(73) Assignee: Comtech EF Data Corp., Tempe, AZ (US)

(*) Notice: Subject to any disclaimer, the term of this patent is extended or adjusted under 35 U.S.C. 154(b) by 0 days.

(21) Appl. No.: 13/960,625

(22) Filed: Aug. 6, 2013

(65) Prior Publication Data

US 2013/0322576 A1    Dec. 5, 2013

Related U.S. Application Data

(60) Provisional application No. 61/818,826, filed on May 2, 2013.

(51) Int. Cl.
*H04L 27/06* (2006.01)
*H04B 1/06* (2006.01)

(52) U.S. Cl.
CPC ........................ *H04B 1/06* (2013.01)
USPC ........... 375/340; 375/326; 375/376; 375/327; 370/342; 370/335; 370/517; 725/111

(58) Field of Classification Search
USPC .......... 375/340, 326, 376, 327; 370/517, 342, 370/335; 725/111
See application file for complete search history.

(56) References Cited

U.S. PATENT DOCUMENTS

| | | | |
|---|---|---|---|
| 4,896,336 A * | 1/1990 | Henely et al. | 375/324 |
| 4,904,930 A | 2/1990 | Nicholas | |
| 4,912,422 A | 3/1990 | Kobayashi et al. | |
| 5,233,632 A | 8/1993 | Baum et al. | |
| 5,272,446 A | 12/1993 | Chalmers et al. | |
| 6,771,699 B1 | 8/2004 | Karaoquz et al. | |
| 7,151,807 B2 | 12/2006 | Chen | |
| 2003/0231728 A1 * | 12/2003 | Phang et al. | 375/371 |

OTHER PUBLICATIONS

Heinrich Meyr, Marc Moeneclaey, and Stefan A. Fechtel. Digital Communication Receivers: Synchronization, Channel Estimation, and Signal Processing. John Wiley & Sons, Inc. 1998. pp. 457-462.
Bernard Sklar. Digital Communications: Fundamentals and Applications. Second Edition. Prentice Hall PTR. 2001. pp. 63-75 (Sampling Theorem) and pp. 598-643 (Synchronization).

(Continued)

*Primary Examiner* — Leila Malek
(74) *Attorney, Agent, or Firm* — Booth Udall Fuller, PLC

(57) ABSTRACT

A method of accelerated carrier signal acquisition for a digital communication receiver, the method comprising receiving a carrier signal by a receiver comprising a carrier recovery loop (CRL), setting the CRL to an open loop setting using a processor, setting a numerically controlled oscillator (NCO) within the CRL at a center frequency of the NCO, determining, by the processor, one or more initial parameters of the CRL, calculating an estimate and polarity for a sign frequency detection frequency using a sign frequency detector while simultaneously estimating a Fast Fourier Transform (FFT) frequency by running an FFT using the processor, comparing polarities of the estimates of the sign frequency detection frequency and FFT frequency and determining a frequency offset using the processor, and adjusting one or more parameters of the CRL based on the frequency offset using the processor.

20 Claims, 7 Drawing Sheets

(56) References Cited

OTHER PUBLICATIONS

Floyd M. Gardner. Phaselock Techniques. John Wiley & Sons, Inc. 1979.

Alain Blanchard. Phase-Locked Loops: Application to Coherent Receiver Design. John Wiley & Sons, Inc. 1976.

Roland E. Best. Phase-Locked Loops: Design, Simulation, and Applications. Fifth Edition. The McGraw-Hill Companies, Inc. 2003.

Ferdinand Classen and Heinrich Meyr. Two Frequency Estimation Schemes Operating Independently of Timing Information. IEEE 1993. pp. 1996-2000.

* cited by examiner

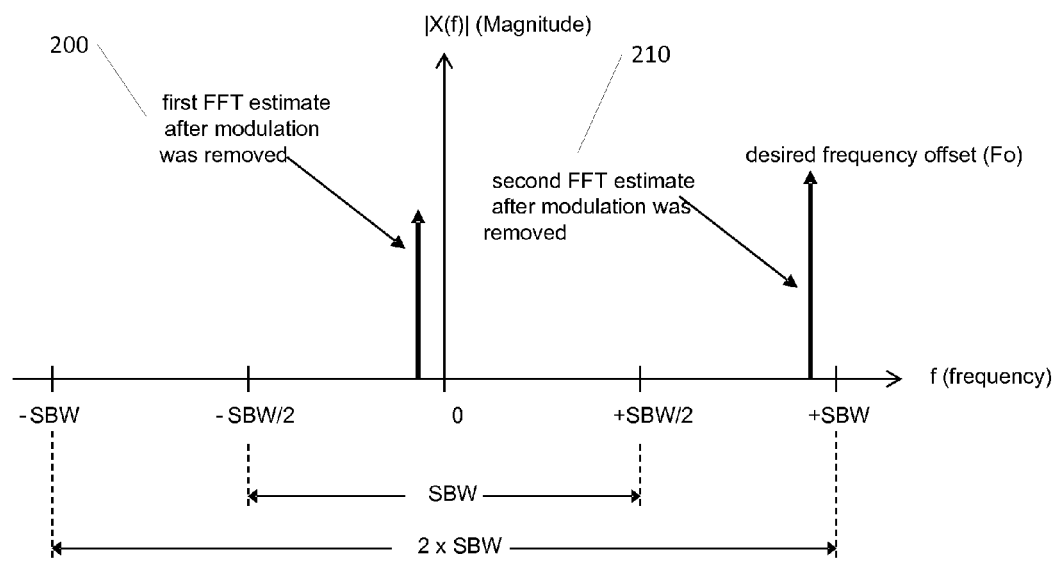
FIG. 2A – PRIOR ART
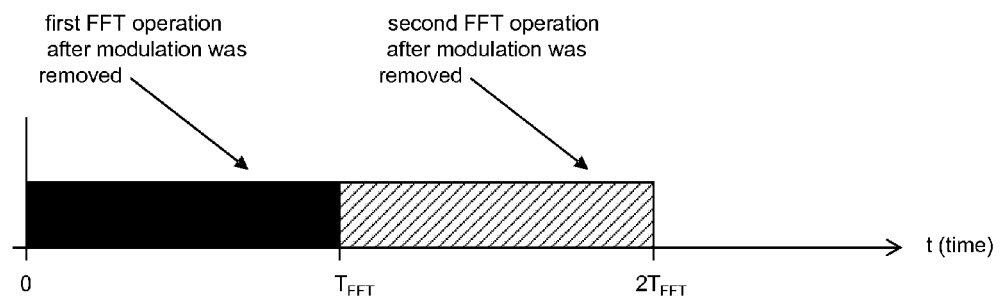
FIG. 2B – PRIOR ART

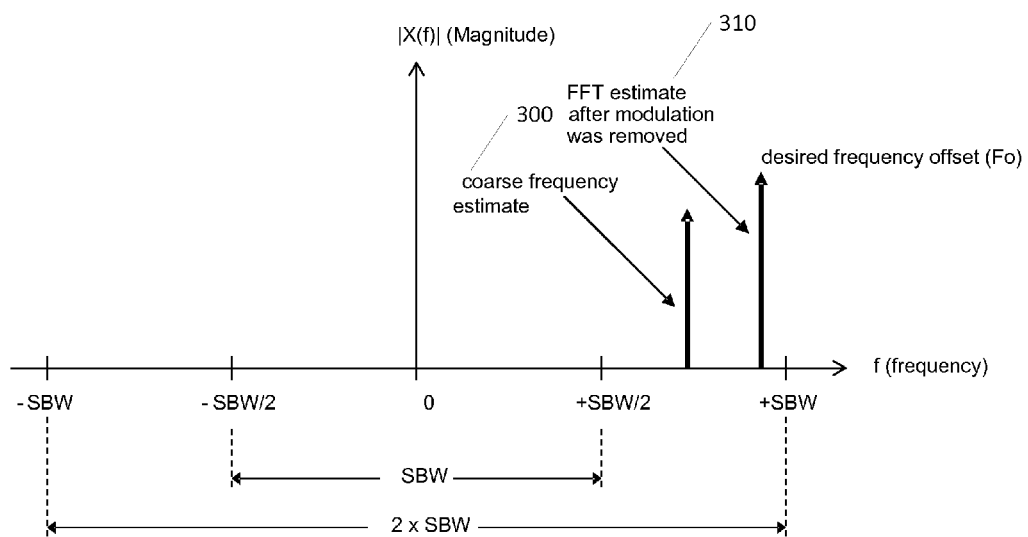
FIG. 3A – PRIOR ART
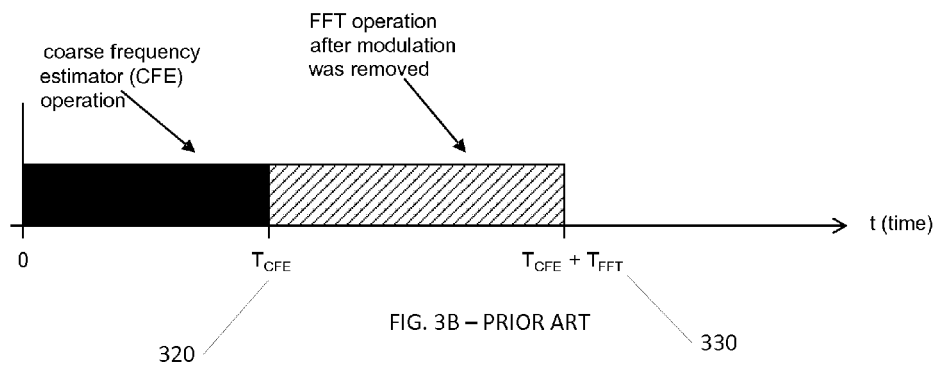
FIG. 3B – PRIOR ART

ACCELERATED CARRIER ACQUISITION METHOD FOR A DIGITAL COMMUNICATION RECEIVER

CROSS REFERENCE TO RELATED APPLICATIONS

This document claims the benefit of the filing date of U.S. Provisional Patent Application No. 61/818,826, entitled "Accelerated Carrier Acquisition Method for a Digital Communication Receiver" to Lazaro F. Cajegas III, which was filed on May 2, 2013, the disclosure of which is hereby incorporated entirely by reference herein.

BACKGROUND

1. Technical Field

Aspects of this document relate generally to telecommunication systems and techniques for transmitting data across a telecommunication channel.

2. Background Art

In digital communication receivers employing M-ary PSK or M-ary QAM, carrier frequency estimation is commonly accomplished using Fast Fourier Transform (FFT) together with modulation removal. The frequency acquisition range using FFT is limited to the FFT search bandwidth (SBW). If the carrier frequency offset (Fo) is beyond SBW but within 2*SBW (i.e. receiver acquisition range is twice the SBW), then the time duration to estimate the frequency will be doubled because it will take at least two sequential FFT operations given that the FFT sampling rate is unchanged. Thus, using currently existing methods and systems, carrier acquisition requires a longer time duration than may be desirable in some applications.

To reduce the length and complexity of the detailed description and to establish a current state of the art, Applicant hereby incorporates by reference in their entirety each reference listed in the numbered paragraphs below:

U.S. Pat. No. 4,904,930—Method of Carrier Frequency Estimation, David C. Nicholas, Feb. 27, 1990.

U.S. Pat. No. 4,912,422—Demodulation System for PSK Signals with Low Carrier to Noise Ratio and Large Frequency Offset, Kobayahi et al., Mar. 27, 1990.

U.S. Pat. No. 5,272,446—Digitally Implemented Fast Frequency Estimator/Demodulator for Low Bit Rte Maritime and Mobile Data Communications Without the Use of an Acquisition Preamble, Chalmers et al., Dec. 21, 1993.

U.S. Pat. No. 5,233,632—Communication system receiver apparatus and method for fast carrier acquisition, Baum et al., Aug. 3, 1993.

U.S. Pat. No. 7,151,807—Fast acquisition of timing a carrier frequency from received signal, Ernest C. Chen, Dec. 19, 2006.

U.S. Pat. No. 6,771,699—Method of rapid carrier-frequency offset acquisition using a periodic training sequence, Karaoquz, et al., Aug. 3, 2004.

Heinrich Meyr, Marc Moeneclaey, and Stefan A. Fechtel. Digital Communication Receivers: Synchronization, Channel Estimation, and Signal Processing. John Wiley & Sons, Inc. 1998. pages 457-462.

Bernard Sklar. Digital Communications: Fundamentals and Applications. Second Edition. Prentice Hall PTR. 2001. Pages 63-75 (Sampling Theorem) and Pages 598-643 (Synchronization).

Floyd M. Gardner. Phaselock Techniques. John Wiley & Sons, Inc. 1979.

Alain Blanchard. Phase-Locked Loops: Application to Coherent Receiver Design. John Wiley & Sons, Inc. 1976.

Roland E. Best. Phase-Locked Loops: Design, Simulation, and Applications. Fifth Edition. The McGraw-Hill Companies, Inc. 2003.

Ferdinand Classen and Heinrich Meyr. Two Frequency Estimation Schemes Operating Independently of Timing Information. IEEE 1993. Pages 1996-2000.

SUMMARY

Implementations of a method of accelerated carrier signal acquisition for a digital communication receiver may comprise receiving a carrier signal by a receiver comprising a carrier recovery loop (CRL), setting the CRL to an open loop setting using a processor, setting a numerically controlled oscillator (NCO) within the CRL at a center frequency of the NCO, determining, by the processor, one or more initial parameters of the CRL, calculating an estimate and polarity for a sign frequency detection frequency using a sign frequency detector while simultaneously estimating a Fast Fourier Transform (FFT) frequency by running an FFT using the processor, comparing polarities of the estimates of the sign frequency detection frequency and FFT frequency and determining a frequency offset using the processor, and adjusting one or more parameters of the CRL based on the frequency offset using the processor.

Particular aspects may include one or more of the following features. When the estimates of the sign frequency detection frequency and the FFT frequency have the same polarity and the FFT frequency estimate is non-zero, the frequency offset is equal to the FFT frequency estimate. When the estimate of the sign frequency detection frequency has a positive polarity and the FFT frequency estimate has a negative polarity, the frequency offset is equal to a sum of a search bandwidth of the FFT and the FFT frequency estimate. When the estimate of the sign frequency detection frequency has a negative polarity and the FFT frequency estimate has a positive polarity, the frequency offset is equal to a difference between the FFT frequency estimate and a search bandwidth of the FFT. When the FFT frequency estimate is zero and the estimate of the sign frequency detection frequency is zero, the frequency offset is equal to zero. When the frequency offset is zero, the FFT frequency estimate is zero and the estimate of the sign frequency detection frequency is estimated by the processor using an implementation imperfection factor. When the FFT frequency estimate is zero and an absolute value of the sign frequency detection frequency estimate is less than a product of the implementation imperfection factor and a search bandwidth of the FFT, the frequency offset is determined by the processor to be zero. When the FFT frequency estimate is zero and an absolute value of the sign frequency detection frequency estimate is greater than a product of the implementation imperfection factor and a search bandwidth of the FFT, the frequency offset is equal to +/− the search bandwidth of the FFT. The method may further comprise setting the CRL to a closed position using the processor such that the CRL achieves a lock on the received carrier signal. The sign frequency detector may be configured to operate at four times a symbol rate of the received carrier signal.

Implementations of a system for accelerated carrier signal acquisition for a digital communication receiver may comprise a receiver configured to receive a carrier signal, the receiver further comprising a carrier recovery loop (CRL) that comprises a numerically controlled oscillator (NCO) and a processor coupled to the CRL and configured to set the CRL to an open loop setting, set the NCO within the CRL at a center frequency of the NCO, determine one or more initial parameters of the CRL, calculate an estimate and polarity for a sign frequency detection frequency using a sign frequency detector while simultaneously estimating a Fast Fourier Transform (FFT) frequency by running an FFT, compare polarities of the estimates of the sign frequency detection frequency and FFT frequency and determine a frequency offset, and adjust one or more parameters of the CRL based on the frequency offset.

Particular aspects may include one or more of the following features. When the estimates of the sign frequency detection frequency and the FFT frequency have the same polarity and the FFT frequency estimate is non-zero, the frequency offset is equal to the FFT frequency estimate. When the estimate of the sign frequency detection frequency has a positive polarity and the FFT frequency estimate has a negative polarity, the frequency offset is equal to a sum of a search bandwidth of the FFT and the FFT frequency estimate. When the estimate of the sign frequency detection frequency has a negative polarity and the FFT frequency estimate has a positive polarity, the frequency offset is equal to a difference between the FFT frequency estimate and a search bandwidth of the FFT. When the FFT frequency estimate is zero and the estimate of the sign frequency detection frequency is zero, the frequency offset is equal to zero. When the frequency offset is zero, the FFT frequency estimate is zero and the estimate of the sign frequency detection frequency is estimated by the processor using an implementation imperfection factor. When the FFT frequency estimate is zero and an absolute value of the sign frequency detection frequency estimate is less than a product of the implementation imperfection factor and a search bandwidth of the FFT, the frequency offset is determined by the processor to be zero. When the FFT frequency estimate is zero and an absolute value of the sign frequency detection frequency estimate is greater than a product of the implementation imperfection factor and a search bandwidth of the FFT, the frequency offset is equal to +/− the search bandwidth of the FFT. The processor may be further configured to set the CRL to a closed position such that the CRL achieves a lock on the received carrier signal. The sign frequency detector may be configured to operate at four times a symbol rate of the received carrier signal.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112(f). Thus, the use of the words "function," "means" or "step" in the Description, Drawings, or Claims is not intended to somehow indicate a desire to invoke the special provisions of 35 U.S.C. §112(f), to define the invention. To the contrary, if the provisions of 35 U.S.C. §112(f) are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112(f). Moreover, even if the provisions of 35 U.S.C. §112 (f) are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIGS. 2A-3B provide examples of prior art methods of frequency estimation by a receiver.

DESCRIPTION

This disclosure, its aspects and implementations, are not limited to the specific components, frequency examples, or methods disclosed herein. Many additional components and assembly procedures known in the art consistent with accelerated carrier signal acquisition are in use with particular implementations from this disclosure. Accordingly, for example, although particular implementations are disclosed, such implementations and implementing components may comprise any components, models, versions, quantities, and/or or the like as is known in the art for such systems and implementing components, consistent with the intended operation.

The methods described in this disclosure may employ digital signal processing (DSP) techniques such as power combining or splitting, frequency mixing, adaptive filtering or equalization, which can be easily implemented in passive and active power splitters and combiners, frequency mixing circuits, Field-Programmable Gate Array (FPGA), Programmable Logic Device (PLD), Programmable Integrated Circuit (PIC), Digital Signal Processor (DSP), Application Specific Integrated Circuit (ASIC) or microprocessors using conventional implementation methods known in the art with knowledge of this disclosure.

Figure 1:
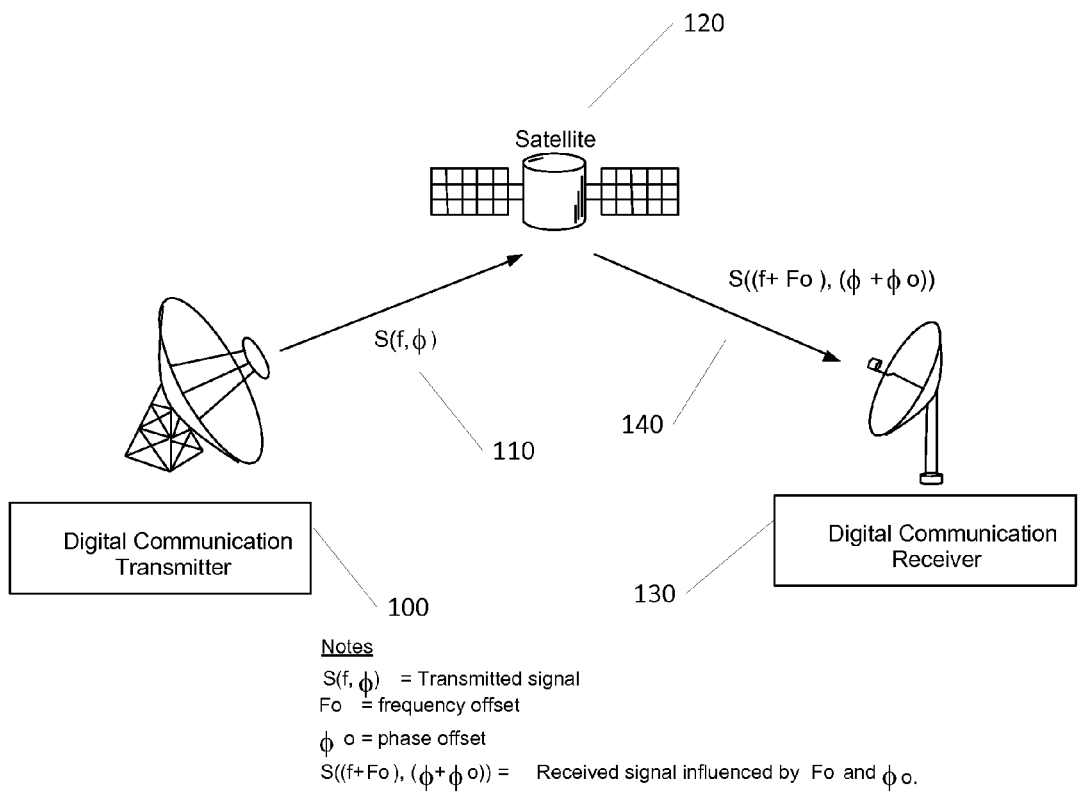
FIG. 1 is an example of a digital communication system as known in the prior art.

Digital communication receivers employing a M-ary PSK or M-ary QAM scheme, which is common in the industry, require carrier signal synchronization before the actual demodulation process begins. FIG. 1, provides an example of such a digital communication system as known in the prior art.

FIG. 1 illustrates that as the digital transmitter 100 transmits a signal 110, S(f, φ), having frequency (f) and phase (φ) which passes through satellite 120 and then to the receiver 130, the received signal 140, S((f+Fo), (φ+φo)), has a carrier frequency and phase deviations known as a frequency offset (Fo) and a phase offset (φo) respectively. These offsets are caused by the drifting nature of the local oscillators used in the satellite and in the frequency upconverters and downconverters used in the ground stations. The most critical estimation is the carrier frequency offset, which is normally determined first prior to phase offset estimation. This is because if the carrier frequency offset estimation is incorrect, then the phase offset estimation will be incorrect as well. Implementations of the system and method disclosed herein focus on the frequency estimation rather than the phase offset determination, which is taken care of by the carrier recovery loop (CRL) circuitry.

Generally, carrier frequency acquisition methods are classified as either non-data-aided or data-aided acquisition. Data-aided acquisition requires synchronization sequence, cyclic, periodic or training sequence which also known as preamble in literature. Non-data aided acquisition, on the other hand, requires no preamble or synchronization sequence and relies on the presence of random symbols generated by the transmitter. The implementations disclosed herein are intended to be directed toward non-data aided acquisition, in which carrier frequency acquisition occurs without the help of a preamble or any predefined synchronization sequences, however, implementations of the system may also be used for data-aided acquisition with the addition of the appropriate modules or blocks as would be known to one of ordinary skill in the art.

However, the requirement for accelerated carrier acquisition is necessary to avoid long periods of loss in communication service. Most of the non-data aided acquisition methods present in the prior art use the popular Fast Fourier Transform (FFT) and modulation removal scheme, which means that modulation has to be removed first prior to FFT operation. As is known in the prior art, the acquisition range of a non-data aided frequency estimation scheme is limited to the FFT search bandwidth (SBW), which is dictated by the FFT sampling rate (Fs) and modulation removal factor (2m). The FFT search bandwidth (SBW) is determined as:

$$SBW = \frac{F_s}{2^m}$$

There are times that the carrier frequency offset is within twice the SBW, that is, the receiver acquisition range for frequency estimation should be set to twice the SBW. In this case, assuming that there is no change in FFT sampling rate, the first approach is to employ two exclusive FFT operations together with modulation removal in order to estimate the carrier frequency offset (Fo) at the receiver as shown in FIGS. 2A-2B.

In these figures, the thick arrows 200, 210 represent the highest peak in the frequency domain after FFT operation for the first and second FFT operations, respectively. In other words, digital or numerically controlled oscillator (NCO) is tuned to −SBW/2 for the first FFT operation and then tuned to +SBW/2 for the second FFT operation. Thus, the time duration of the required to make the estimation is at a minimum, the duration of two FFT operations ($2T_{FFT}$) as shown in FIG. 2B. The highest peak value of the two operations is the frequency estimate. In some cases, this method of frequency estimation may result in a false peak, which leads to an incorrect frequency estimate. Thereby, to improve the accuracy of the frequency estimation by accounting for false peaks, more than two FFT operations need to be performed which increases the duration of the acquisition process by requiring more time to acquire a lock.

In order to alleviate this additional time to lock, another approach used in the prior art is to employ a coarse frequency estimator or detector followed by one FFT operation together with modulation removal to finally estimate the frequency, an example of which is shown in FIGS. 3A-3B. In some aspects of the prior art, the coarse estimator is an FFT without modulation removal. In this case, the digital oscillator is tuned to zero frequency and the coarse frequency estimator is run. Once the coarse frequency estimate 300 is done, the digital oscillator is then tuned to this estimate, and the FFT is then run together with modulation removal 310. One drawback of this approach is that the coarse frequency estimator has to be sure that the estimate lies within the SBW of the FFT where the desired frequency offset is. Otherwise, if the coarse estimate is incorrect, then the FFT estimate will also be incorrect. Because of this, an additional time for coarse frequency estimation (TCFE) 320 is required prior to FFT estimation, thereby resulting in a total time of $T_{CFE}+T_{FFT}$ 330 having elapsed prior to arriving at a carrier signal lock. Thus, both of the approaches of the prior art result in increased acquisition times.

Using implementations of the system and method disclosed herein, with the FFT sampling rate unaltered, the frequency acquisition range is no longer limited to SBW but to twice the SBW. Only one FFT operation is needed with the help of the sign frequency detector (SFD), which starts to operate at the same time as the FFT. Hence, the time duration for frequency estimation is shorter making the carrier signal acquisition quicker.

Figure 4A:
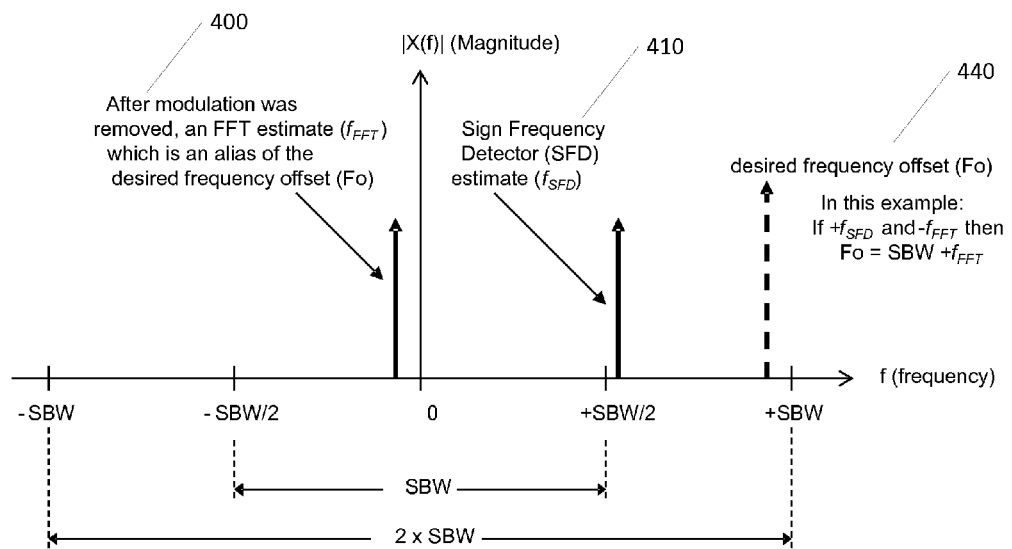
FIGS. 4A-B provide examples of an implementation of a method for frequency estimation by a receiver.
Figure 4B:
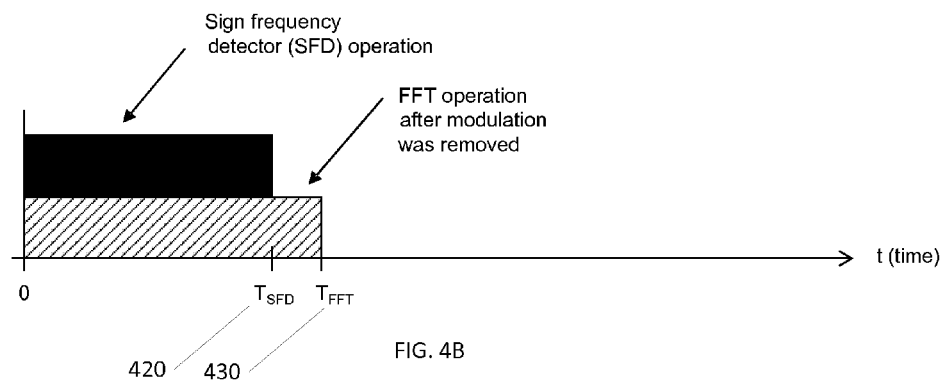

In an implementation of the system and method of the present disclosure, as depicted in FIGS. 4A-4B, when the acquisition range is equal to twice the SBW, only one FFT operation 400 is needed together with modulation removal, but a sign frequency detector (SFD) operates simultaneously with the FFT. The SFD is designed to finish the operation and produce an estimate 410 earlier at time ($T_{SFD}$) 420, which is earlier than the time duration of the FFT ($T_{FFR}$) 430. In this implementation, the resulting FFT is thought to have an incorrect frequency estimate in one case (as mentioned in the first approach of the prior art). However, the incorrect frequency estimate is actually an alias 400 of the desired frequency offset (Fo) 440. Since the FFT sampling rate remains unchanged, the signal of interest, wherein the frequency offset is to be determined, is higher than the sampling rate, which is considered to be under-sampled. Based on a sampling theorem, which is known in the prior art, the sampling rate must be at least twice the frequency of the signal of interest in order to properly recover the signal. As a result, the SFD makes a determination as to whether the FFT estimate is an alias of the desired frequency offset or not.

The implementations of the present invention are described herein based on the following assumptions. First, the automatic gain control (AGC) of the digital communication receiver must converge quickly and must be stable. Secondly, the symbol clock recovery loop (also known as symbol timing loop, STL) is assumed to achieve a lock and remain stable. There are numerous existing methods to achieve these assumptions which one of ordinary skill in the art would be familiar with and thus, will not be described here.

Implementations of the accelerated carrier acquisition method disclosed herein involve accelerated carrier frequency offset estimation and its connectivity with the carrier recovery loop (CRL) circuitry. The CRL plays an important role in achieving reliable carrier acquisition with proper design of its loop parameters. Although it is not the intention here to discuss in detail the CRL design since it is based on phase-lock loop principles which are known in the art, there is an important requirement in the selection of the FFT resolution relative to the CRL loop bandwidth.

Figure 5:
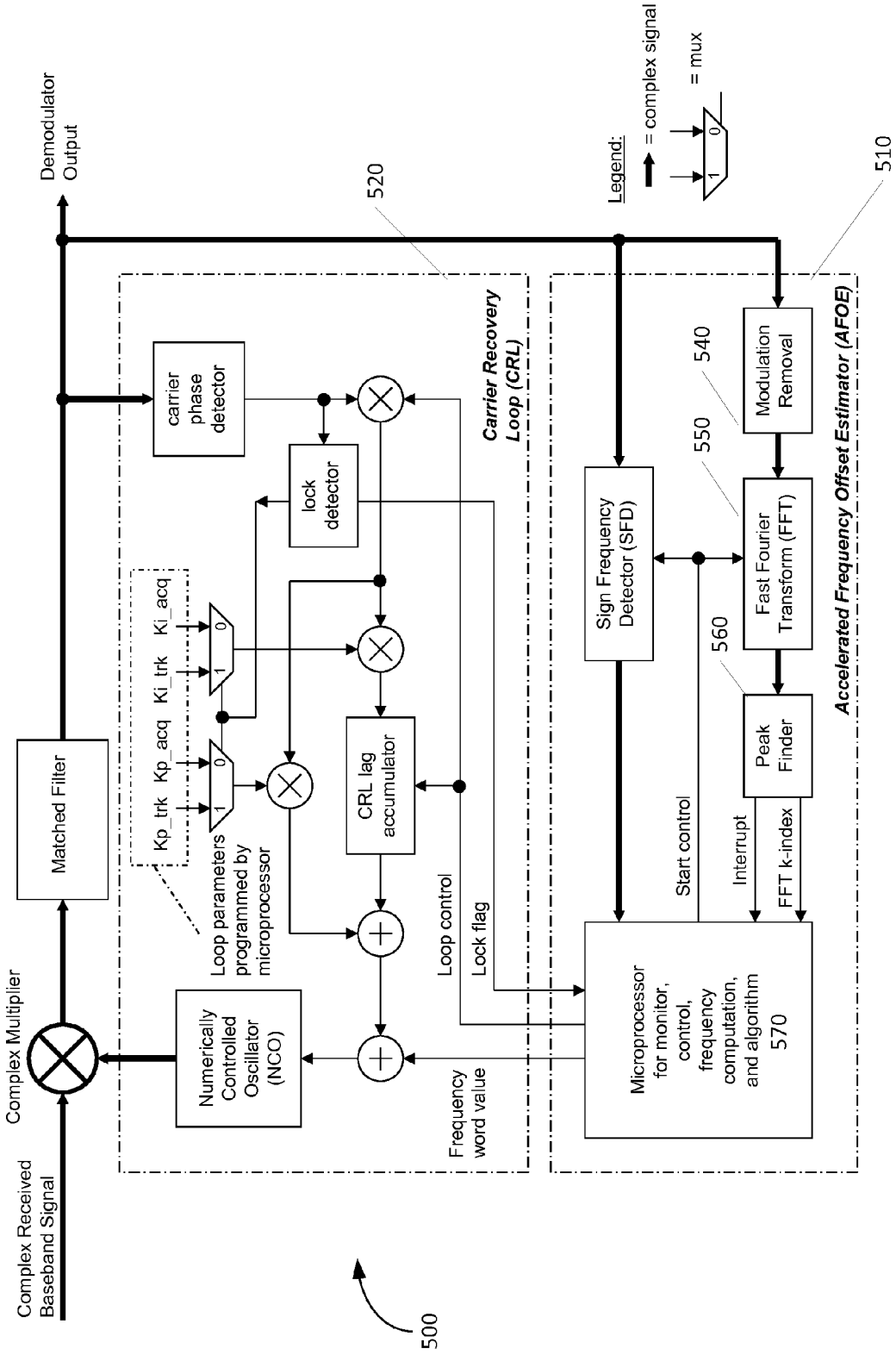
FIG. 5 is an example of architecture for an implementation of a system for accelerated carrier signal acquisition.

FIG. 5 shows an example of a novel architecture of an implementation of an accelerated carrier acquisition system 500 as disclosed herein. As illustrated, there are two major groups of building blocks as highlighted in dotted lines. One is the accelerated carrier frequency offset estimator (AFOE) 510 and the other is the carrier recovery loop (CRL) 520. The AFOE is comprised of a sign frequency detector (SFD) 530, modulation removal 540, fast Fourier transform (FFT) 550, peak finder 560, and a microprocessor 570. All of the building blocks shown can be implemented using a field-programmable logic array (FPGA) device for real-time signal processing operation which provides even faster carrier acquisition times than a digital signal processor (DSP) with memory which stores data first before processing; however a DSP may also be used.

Figure 6:
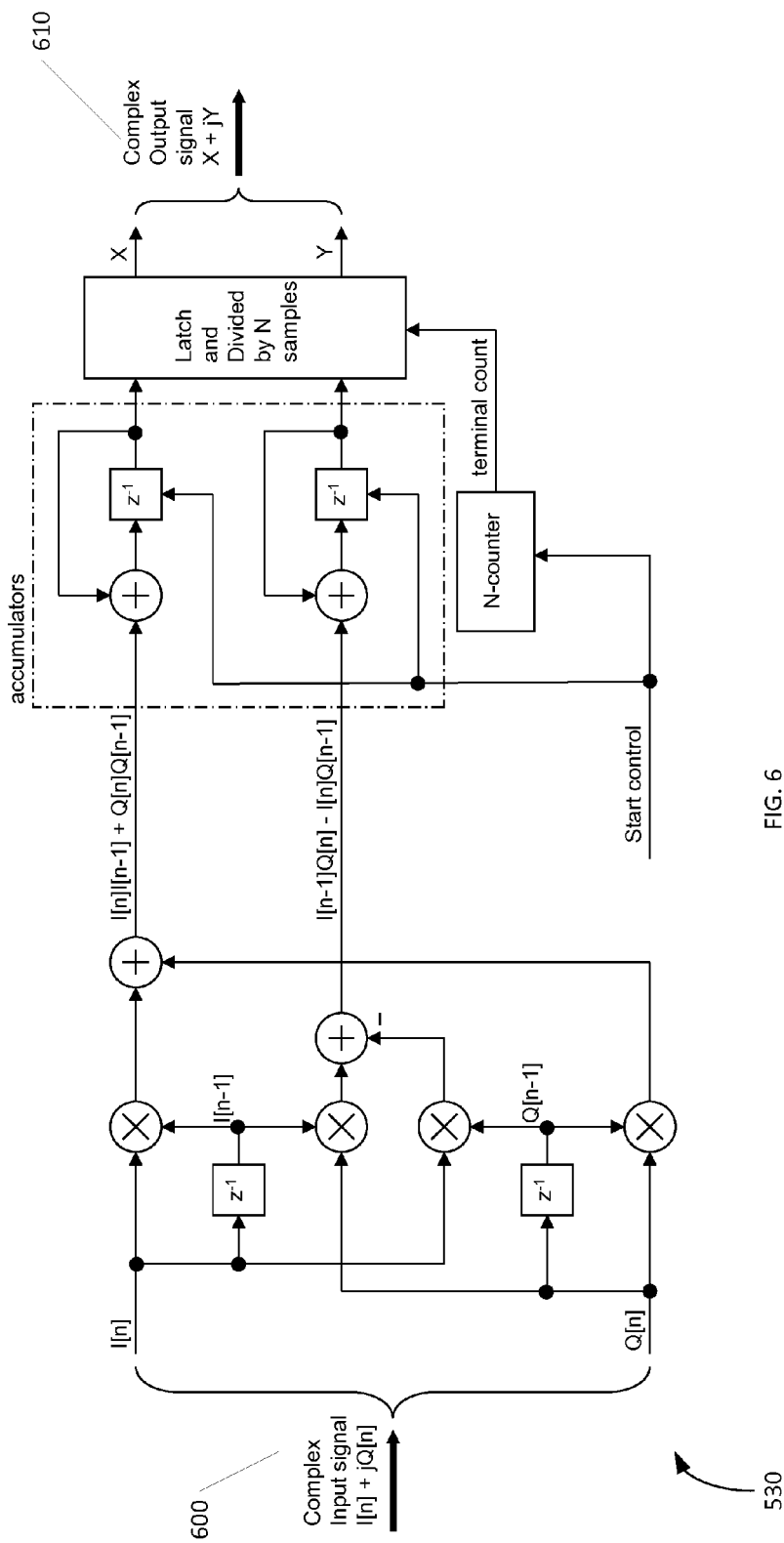
FIG. 6 is an example of architecture of a sign frequency detector as used in an implementation of a system for accelerated carrier signal acquisition.

The SFD 530 is based on a modified frequency estimator that is known in the prior art. It can roughly estimate the frequency up to $(1+\beta)$ times symbol rate (Rs), where $\beta$ is the excess bandwidth factor or roll-off factor of matched filter, as described in the prior art. FIG. 6, below, depicts an example of the building blocks of SFD according to one implementation of the disclosed system and method. The SFD output 610 provides the average of correlation of the complex baseband input signal 600 with its one sample delayed input signal. In addition to one or more delay elements that result in a one-sample delay, the SFD 530 may also comprise one or more multipliers, accumulators, N-counters, latches, and divided-by-N blocks. The frequency computation is accomplished in the microprocessor using arctangent function of SFD output. However, the SFD 530 is not used to estimate the frequency but rather it is employed to determine if the FFT frequency estimate is an alias of the desired frequency offset or not by observing and comparing the polarity or sign of its estimate relative to FFT estimate. Hence, the accuracy of estimation is not important for SFD. The SFD 530 is designed to operate properly at four times the symbol rate (4×Rs), which is the minimum multiplier of the symbol rate that may be used for proper operation and provides simplicity in hardware implementation. The use of higher multipliers is also intended to be included in this disclosure; however, this may increase the complexity, power consumption, thus, the cost of such implementations.

The FFT together with modulation removal and a peak finder determines the actual frequency offset. The calculation of the frequency offset is done in the microprocessor using the FFT k-index with the highest peak in terms of FFT magnitude. The sampling rate of the FFT together with the modulation removal is equal to the symbol rate. The main reason for using the sampling rate equal to the symbol rate is to provide the best performance in the presence of additive white Gaussian noise (AWGN) especially when operating at higher-order modulation such as for example, 8-PSK, however it is intended that any appropriate sampling rate may also be used based on noise conditions and other factors known to one of ordinary skill in the art.

To have rapid carrier frequency estimation, in some implementations, both the SFD 530 and FFT 550 begin processing data simultaneously. Given that SFD 530 operates at four times the symbol rate (4×Rs) and FFT operates at the symbol rate (Rs 0, the SFD 530 will finish operating earlier than the FFT 550 with the same number of samples to process. Since the FFT 550 will finish last, the FFT 550 will generate an interrupt flag to the microprocessor 570 for frequency computation for both FFT 550 and SFD 530.

After the frequency estimation, the CRL numerically controlled oscillator (NCO) will be programmed by the microprocessor using the estimated frequency. The CRL is based on a phase-locked loop (PLL) principle. As shown, the CRL is classified as a second-order PLL and can be thought of as a proportional and integration PLL. This PLL has proportional term called Kp and the integration term called Ki. Basically, the PLL has two modes of operation, namely acquisition and tracking mode. In acquisition mode, the loop parameters are Kp_acq and Ki_acq, while in tracking mode they are Kp_trk and Ki_trk. Generally, the loop bandwidth in tracking mode is smaller than the loop bandwidth in acquisition mode. Since CRL is based on PLL, the loop parameters (Kp_acq, Kp_trk, Ki_acq, and Ki_trk) of the CRL can be designed and can be found in most PLL literatures commonly known to those of ordinary skill in the art. For this reason it will not be covered here in detail. The only thing to note is that the FFT frequency resolution must be chosen such that it is within CRL loop bandwidth (LBW). Let $N_{FFT}$=the number of FFT samples and $F_s$=the sampling rate. The FFT frequency resolution (FFR) is:

$$FFR = \frac{F_s}{N_{FFT}}$$

$$FFR \leq CRL\ LBW$$

The main reason for this is that the CRL will be able to pull in the carrier reliably at the estimated frequency, bearing in mind that the LBW is determined depending upon how much noise is being applied or signal-to-noise (SNR) requirement.

Figure 7:
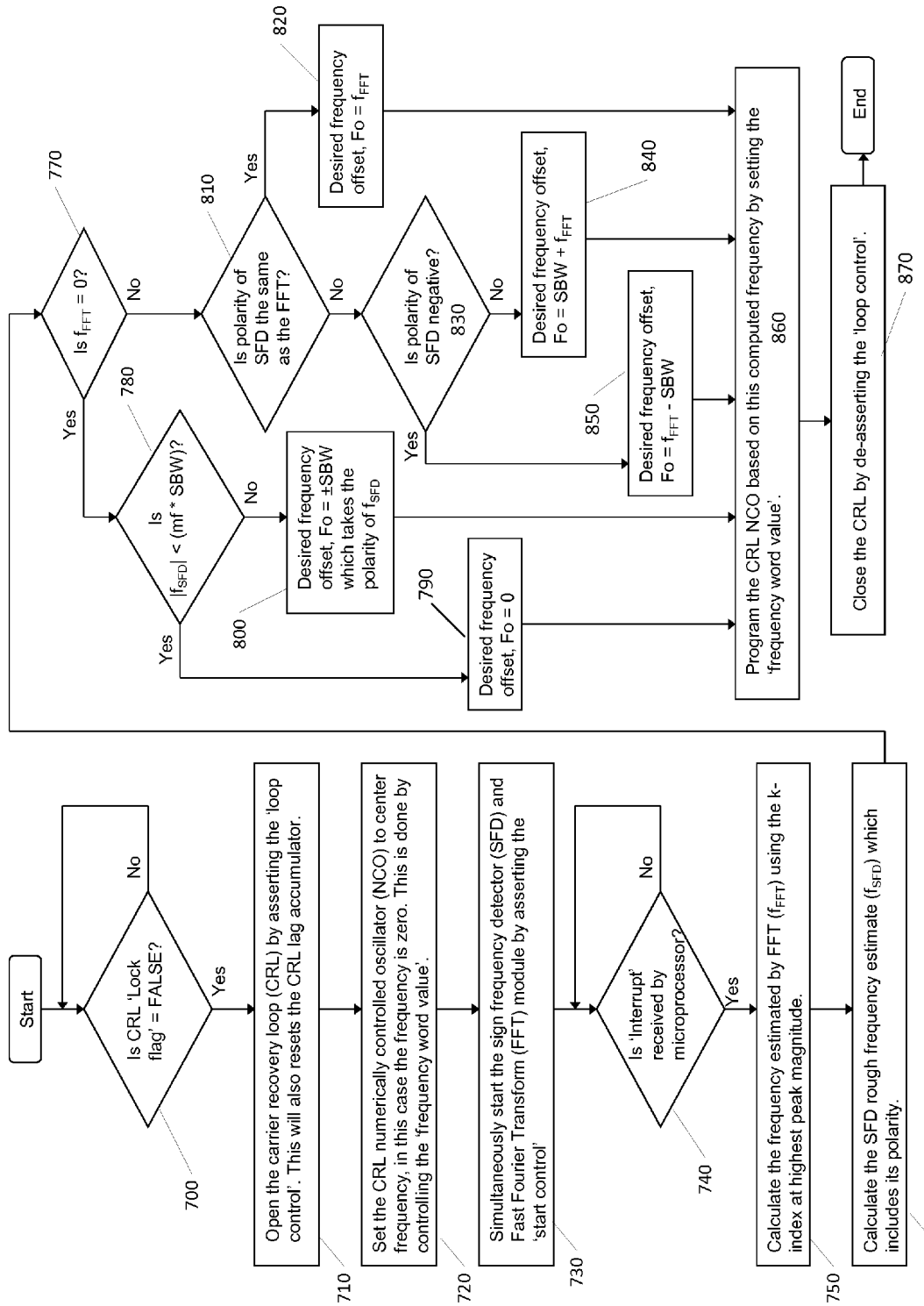
FIG. 7 is a block diagram of an implementation of a method of accelerated carrier signal acquisition.

FIG. 7 illustrates a block diagram of an implementation of a method of accelerated carrier signal acquisition. Before system begins running the algorithm, the loop parameters of the CRL have to be determined first using loop equations found in most PLL literatures known in the art. The algorithm starts when the CRL 'lock flag' from its lock detect circuit is not locked (or lock flag=FALSE) 700. When this happens, the CRL is set to open loop by asserting the 'loop control' via the microprocessor 710. Opening the CRL allows the CRL numerically controlled oscillator (NCO) to run freely without being driven by its loop circuitry. That means the NCO frequency will not be moving and remains constant at a programmed value, resulting in reliable frequency estimation. After the CRL is opened, the NCO will be programmed to its center frequency, and in this case the frequency is zero, which is accomplished by using the 'frequency word value' via microprocessor 720. Then, by asserting the 'start control' via microprocessor, the SFD and FFT module will begin processing the data simultaneously for frequency estimation 730. This is a one-shot operation to provide the shortest time possible in estimating the frequency. The 'start control' of the SFD resets its accumulators and N-counter as shown in FIG. 6. The SFD will finish first and the FFT will finish last which provides an 'interrupt flag' to the microprocessor for frequency computation 740. The FFT frequency estimate ($f_{FFT}$) is then calculated 750 as follows:

$$f_{FFT} = k_{max} \cdot \frac{F_s}{N_{FFT}} \cdot \frac{1}{2^m} \text{ for } 0 \le k_{max} < \frac{N_{FFT}}{2} \text{ (positive frequency)}$$

$$f_{FFT} = (k_{max} - N_{FFT}) \cdot \frac{F_s}{N_{FFT}} \cdot \frac{1}{2^m} \text{ for } N_{FFT} > k_{max} \ge \frac{N_{FFT}}{2} \text{ (negative frequency)}$$

where:
$f_{FFT}$=frequency estimated by FFT in Hz
$k_{max}$=k-index of FFT with the highest peak in terms of magnitude,
k-index ranges from 0 to ($N_{FFT}-1$)
$N_{FFT}$=number of FFT samples (also called as number of FFT points)
$2^m$=modulation removal factor, for BPSK m=1, QPSK m=2, 16-QAM m=2
$F_s$=sampling rate in Hz (or samples/sec), in this case it is equal to symbol rate (Rs).

On the other hand, the SFD frequency estimate is calculated 760 as follows. Let I[n]+jQ[n] be the discrete complex matched filtered output signal. The output of the SFD, X+jY is determined as:

$$X = \frac{1}{N}\sum_{n=1}^{N}(I[n]I[n-1] + Q[n]Q[n-1])$$

$$Y = \frac{1}{N}\sum_{n=1}^{N}(I[n-1]Q[n] - I[n]Q[n-1])$$

To calculate the frequency estimate of SFD, the equation is:

$$f_{SFD} = \frac{f_{S_{SFD}}}{2\pi} \cdot \text{Tan}^{-1}\left(\frac{Y}{X}\right)$$

Where:
$f_{SFD}$=SFD frequency estimate
$f_{S_{SFD}}$=SFD sampling rate which is equal to 4 times the symbol rate (i.e. 4×Rs)

The sign or polarity of the SFD frequency is dictated by the $\text{Tan}^{-1}(\ )$ which is a full-circle arctangent function (i.e. 0 to $2\pi$). When the arctangent function resulted between 0 to $\pi$, then it is a positive frequency. Otherwise, it will be the negative frequency.

After calculating the SFD and FFT frequencies, comparison of the polarities of SFD and FFT will take place 810, noting that the SFD frequency accuracy is not of great concern since its sign or polarity is the deciding factor.

First, the FFT estimate is checked whether the resulting estimate is zero or not 770. There are two cases when the FFT estimate is zero. The first case is when the FFT estimate is actually zero frequency offset and the second case is when the FFT estimate implies that the frequency offset is either +SBW or −SBW. In an ideal case wherein there is no noise (i.e. AWGN), if the FFT estimate is zero and the SFD estimate is also zero, then the frequency offset is zero. On the other hand, if FFT estimate is zero and the SFD estimate is not zero, then frequency offset is either +SBW or −SBW where the sign or polarity of SFD is used as a deciding factor. However, in the real world, if the actual frequency offset is zero, then the FFT estimate is zero, but the SFD estimate cannot be zero due to some receiver implementation imperfections such as DC offsets, IQ imbalance, etc. Because of this, a factor is introduced called implementation imperfection factor (mf) that will be used to resolve this ambiguity of the FFT estimate when it is zero. The implementation imperfection factor (mf) is a very complex to determine due to dependency on the electronic components being used and it is beyond the scope of this context. However, a simpler method of estimating this factor is to do some empirical measurements. Bearing in mind that the SFD has an estimation range of up to one symbol rate (Rs), a typical implementation imperfection factor (mf) is found to be about 0.25 of the SBW against the SFD estimation. So, if the absolute value of SFD is less than (mf*SBW), and if the FFT estimate is zero 780, then the frequency offset is zero 790. Otherwise, the frequency offset is either +SBW or −SBW which uses the sign or polarity of SFD 800.

If both polarities of SFD and FFT are the same and the FFT estimate is non-zero, then the desired frequency offset (Fo) estimate is determined by the FFT frequency estimate ($f_{FFT}$) 820, that is:

$$Fo = f_{FFT} \text{ (polarities of } f_{SFD} \text{ and } f_{FFT} \text{ are the same)}$$

If the polarity of the SFD frequency does not agree with the FFT frequency 830, then the FFT frequency estimate ($f_{FFT}$) is actually an alias of the desired frequency offset (Fo). So, if the polarity of the SFD frequency is positive but the FFT frequency is negative, then the desired frequency offset (Fo) 840 is:

$$Fo = SBW + f_{FFT} \text{ (for +} f_{SFD} \text{ and } -f_{FFT} \text{)}$$

If the polarity of the SFD frequency is negative but the FFT frequency is positive, then the desired frequency offset (Fo) 850 is:

$$Fo = f_{FFT} - SBW \text{ (for } -f_{SFD} \text{ and +} f_{FFT} \text{)}$$

After determining the desired frequency offset (Fo), the CRL NCO is programmed by a microprocessor using this estimate by setting the 'frequency word value' 860. Finally, the CRL loop is closed by de-asserting the 'loop control,' which will then pull in the carrier and achieve carrier lock 870.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:
1. A method of accelerated carrier signal acquisition for a digital communication receiver, the method comprising:

receiving a carrier signal by a receiver comprising a carrier recovery loop (CRL);
setting the CRL to an open loop setting using a processor;
setting a numerically controlled oscillator (NCO) within the CRL at a center frequency of the NCO;
determining, by the processor, one or more initial parameters of the CRL;
calculating an estimate and polarity for a sign frequency detection frequency using a sign frequency detector while simultaneously estimating a Fast Fourier Transform (FFT) frequency by running an FFT using the processor;
comparing polarities of the estimates of the sign frequency detection frequency and FFT frequency and determining a frequency offset using the processor; and
adjusting one or more parameters of the CRL based on the frequency offset using the processor.

2. The method of claim 1, wherein when the estimates of the sign frequency detection frequency and the FFT frequency have the same polarity and the FFT frequency estimate is non-zero, the frequency offset is equal to the FFT frequency estimate.

3. The method of claim 1, wherein when the estimate of the sign frequency detection frequency has a positive polarity and the FFT frequency estimate has a negative polarity, the frequency offset is equal to a sum of a search bandwidth of the FFT and the FFT frequency estimate.

4. The method of claim 1, wherein when the estimate of the sign frequency detection frequency has a negative polarity and the FFT frequency estimate has a positive polarity, the frequency offset is equal to a difference between the FFT frequency estimate and a search bandwidth of the FFT.

5. The method of claim 1, wherein when the FFT frequency estimate is zero and the estimate of the sign frequency detection frequency is zero, the frequency offset is equal to zero.

6. The method of claim 1, wherein when the frequency offset is zero, the FFT frequency estimate is zero and the estimate of the sign frequency detection frequency is estimated by the processor using an implementation imperfection factor.

7. The method of claim 6, wherein when the FFT frequency estimate is zero and an absolute value of the sign frequency detection frequency estimate is less than a product of the implementation imperfection factor and a search bandwidth of the FFT, the frequency offset is determined by the processor to be zero.

8. The method of claim 6, wherein when the FFT frequency estimate is zero and an absolute value of the sign frequency detection frequency estimate is greater than a product of the implementation imperfection factor and a search bandwidth of the FFT, the frequency offset is equal to +/− the search bandwidth of the FFT.

9. The method of claim 1, further comprising setting the CRL to a closed position using the processor such that the CRL achieves a lock on the received carrier signal.

10. The method of claim 1, wherein the sign frequency detector is configured to operate at four times a symbol rate of the received carrier signal.

11. A system for accelerated carrier signal acquisition for a digital communication receiver, the system comprising:

a receiver configured to receive a carrier signal, the receiver further comprising a carrier recovery loop (CRL) that comprises a numerically controlled oscillator (NCO); and
a processor coupled to the CRL and configured to:
set the CRL to an open loop setting;
set the NCO within the CRL at a center frequency of the NCO;
determine one or more initial parameters of the CRL;
calculate an estimate and polarity for a sign frequency detection frequency using a sign frequency detector while simultaneously estimating a Fast Fourier Transform (FFT) frequency by running an FFT;
compare polarities of the estimates of the sign frequency detection frequency and FFT frequency and determine a frequency offset; and
adjust one or more parameters of the CRL based on the frequency offset.

12. The system of claim 11, wherein when the estimates of the sign frequency detection frequency and the FFT frequency have the same polarity and the FFT frequency estimate is non-zero, the frequency offset is equal to the FFT frequency estimate.

13. The system of claim 11, wherein when the estimate of the sign frequency detection frequency has a positive polarity and the FFT frequency estimate has a negative polarity, the frequency offset is equal to a sum of a search bandwidth of the FFT and the FFT frequency estimate.

14. The system of claim 11, wherein when the estimate of the sign frequency detection frequency has a negative polarity and the FFT frequency estimate has a positive polarity, the frequency offset is equal to a difference between the FFT frequency estimate and a search bandwidth of the FFT.

15. The system of claim 11, wherein when the FFT frequency estimate is zero and the estimate of the sign frequency detection frequency is zero, the frequency offset is equal to zero.

16. The system of claim 11, wherein when the frequency offset is zero, the FFT frequency estimate is zero and the estimate of the sign frequency detection frequency is estimated by the processor using an implementation imperfection factor.

17. The system of claim 16, wherein when the FFT frequency estimate is zero and an absolute value of the sign frequency detection frequency estimate is less than a product of the implementation imperfection factor and a search bandwidth of the FFT, the frequency offset is determined by the processor to be zero.

18. The system of claim 16, wherein when the FFT frequency estimate is zero and an absolute value of the sign frequency detection frequency estimate is greater than a product of the implementation imperfection factor and a search bandwidth of the FFT, the frequency offset is equal to +/− the search bandwidth of the FFT.

19. The system of claim 11, wherein the processor is further configured to set the CRL to a closed position such that the CRL achieves a lock on the received carrier signal.

20. The system of claim 11, wherein the sign frequency detector is configured to operate at four times a symbol rate of the received carrier signal.

* * * * *